(12) United States Patent
Ambroset et al.

(10) Patent No.: US 10,245,619 B2
(45) Date of Patent: Apr. 2, 2019

(54) FOODSTUFF SIEVE STATION

(71) Applicant: Electrolux Professional S.p.A., Pordenone (IT)

(72) Inventors: Alessio Ambroset, Pordenone (IT); Omar Fracas, Pordenone (IT); Deny Longo, Pordenone (IT); Maurizio Scacco, Pordenone (IT)

(73) Assignee: Electrolux Professional S.p.A., Pordenone (IT)

( * ) Notice: Subject to any disclaimer, the term of this patent is extended or adjusted under 35 U.S.C. 154(b) by 327 days.

(21) Appl. No.: 15/038,067

(22) PCT Filed: Nov. 25, 2014

(86) PCT No.: PCT/EP2014/075581
§ 371 (c)(1),
(2) Date: May 20, 2016

(87) PCT Pub. No.: WO2015/078878
PCT Pub. Date: Jun. 4, 2015

(65) Prior Publication Data
US 2016/0303610 A1 Oct. 20, 2016

(30) Foreign Application Priority Data
Nov. 26, 2013 (EP) .................................. 13194512

(51) Int. Cl.
*B07B 1/22* (2006.01)
*A47J 19/00* (2006.01)
(Continued)

(52) U.S. Cl.
CPC .................. *B07B 1/22* (2013.01); *A21C 9/00* (2013.01); *A23P 20/12* (2016.08); *A23P 30/00* (2016.08)

(58) Field of Classification Search
CPC ...... B01D 33/04; B01D 33/06; B01D 33/067; B01D 33/073; B01D 33/11; B01D 2033/07; B07B 1/22
(Continued)

(56) References Cited

U.S. PATENT DOCUMENTS 2,358,827 A * 9/1944 Rakowsky ................ B02B 1/04
                                                                241/10
2,499,590 A * 3/1950 Konupek .................. B02B 3/04
                                                                241/56
(Continued)

OTHER PUBLICATIONS

International Search Report for Corresponding Application No. PCT/EP2014/075581, dated Feb. 19, 2015.

*Primary Examiner* — Dana Ross
*Assistant Examiner* — Lawrence H Samuels
(74) *Attorney, Agent, or Firm* — Pearne & Gordon LLP

(57) ABSTRACT

A foodstuff sieve station includes a hopper to pour floury foodstuff and an electrically-operated sifting assembly to sift it for separating impurities from still-usable foodstuff. The sifting assembly includes a hopper-shaped with bell-shaped, rotatable sieve housed/recessed inside the casing. The sieve has-an axis tilted with respect to the vertical and an upward mouth underneath an outlet of the hopper to receive foodstuff therefrom. An electric motor assembly rotates the sieve about the axis. The sieve prevents the foodstuff having a grain size higher that a threshold value to flow through, and has an inwardly protruding assembly that projects from the inner surface and extends on a helical-shaped path from the bottom of the sieve to the mouth of the sieve.

15 Claims, 3 Drawing Sheets

(51) Int. Cl.
*A21C 9/00* (2006.01)
*A23P 20/12* (2016.01)
*A23P 30/00* (2016.01)

(58) Field of Classification Search
USPC .......................... 210/400–402; 99/494, 535
See application file for complete search history.

(56) References Cited

U.S. PATENT DOCUMENTS

| | | | |
|---|---|---|---|
| 3,129,167 A | 4/1964 | Frangos | |
| 3,313,414 A * | 4/1967 | Cox | B07B 1/38 |
| | | | 209/236 |
| 3,648,649 A * | 3/1972 | Wasserman | A21C 9/04 |
| | | | 118/31 |
| 3,910,227 A * | 10/1975 | Reece | A21C 1/00 |
| | | | 118/29 |
| 4,182,260 A | 1/1980 | Reece | |
| 4,458,586 A | 7/1984 | Reed | |
| 4,550,677 A * | 11/1985 | Reese | A23P 20/12 |
| | | | 118/31 |
| 4,936,246 A * | 6/1990 | Reece | A21C 9/04 |
| | | | 118/22 |
| 4,952,309 A * | 8/1990 | King | B07B 1/20 |
| | | | 209/235 |
| 5,226,354 A * | 7/1993 | Stewart | A23B 4/10 |
| | | | 118/16 |
| 5,265,525 A * | 11/1993 | Stewart | A23B 4/10 |
| | | | 118/16 |
| 6,718,867 B2 * | 4/2004 | Hatakeyama | A47J 19/027 |
| | | | 99/287 |
| 6,726,024 B2 * | 4/2004 | Nakano | B07B 1/46 |
| | | | 209/275 |
| 2007/0000436 A1 | 1/2007 | Zweifel et al. | |

\* cited by examiner

FOODSTUFF SIEVE STATION

The present invention relates to a foodstuff sieve station.

More in detail, the present invention relates to a foodstuff breading station for manually breading foodstuff pieces, to which the following description refers purely by way of example without implying any loss of generality.

As is known, in today's restaurants the breading process of foodstuff pieces such as, for example, chicken pieces or vegetable pieces, typically requires a person to manually apply a breading preparation to the moist foodstuff pieces inside a basin-shaped container, traditionally called "breading lug", which contains a large amount of breading preparation.

Unluckily over time moisture causes the breading preparation to clot into dough balls which are unsuitable for further use, therefore the breading preparation necessitates to be periodically sifted to remove the dough balls.

For what above, in today's restaurants the foodstuff breading process normally takes place onto a special foodstuff breading station having, on worktop, a substantially rectangular-shaped upper hopper whose inlet mouth is suitably shaped/structured to accommodate one breading lug. The foodstuff breading station furthermore comprises, beneath the worktop, an electrically-operated sifting assembly which is in direct communication with the outlet mouth of the hopper on worktop so as to receive the used breading preparation poured into the hopper, and is structured so as to be able to sift the used breading preparation for separating the dough balls from the still-usable breading preparation and then to convey the dough balls and the still-usable breading preparation into two distinct, manually-removable, basin-shaped containers located underneath the sifting assembly.

According to a known solution, the electrically-operated sifting assembly comprises a basin-shaped sieve member that closes the outlet mouth of the hopper and has a substantially hemi-cylindrical bottom portion, and a rotatable cochlea which is arranged substantially coaxial to the horizontally-oriented longitudinal axis of the hemi-cylindrical bottom portion of the basin-shaped sieve member.

Along the helical edges, the cochlea is provided with peripheral bristles capable of brushing the cylindrical inner surface of the hemi-cylindrical bottom portion of the sieve member, and the sifting assembly furthermore comprises an electric motor assembly which is capable of driving into rotation the rotatable cochlea so that the cochlea bristles can slowly push the dough balls that accumulates on the bottom portion of the basin-shaped sieve member towards an axial end of the same bottom portion wherein the sieve member has a discharge opening which is to suitably shaped to allow the dough balls to fall out of the sieve member. This discharge opening, in turn, directly communicates with a drain chute structured to channel the dough balls away of the basin-shaped sieve member.

Lastly the electrically-operated sifting assembly comprises two manually removable, basin containers which are arranged underneath the hopper, one vertically aligned with the bottom portion of the basin-shaped sieve member so as to receive the still-usable breading preparation passing through the bottom wall of the sieve member, and the other vertically aligned to the output mouth of the drain chute so as to receive the dough balls and other impurities to be thrown away.

U.S. Pat. No. 4,952,309 discloses a foodstuff breading station according to the above.

Unluckily the bristles of the cochlea wear quite quickly during operation, thus sifting assembly requires periodical replacement of the bristles to correctly operate.

Furthermore the sifting assembly has a relatively low filtration efficiency and is used to clog quite often because it is unable to promptly sift the whole amount of breading preparation normally stored inside one breading lug. Thus the user of the foodstuff breading station is usually requested to manually slowly pour the used breading preparation into the hopper of the foodstuff breading station before starting again the manually breading of the foodstuff pieces inside as new breading lug.

Finally the sifting assembly is relatively difficult to clean and is relatively cumbersome, thus leaving not so much clear space underneath the worktop of the foodstuff breading station.

Aim of the present invention is to provide a foodstuff breading station having a higher filtration efficiency and cheaper maintenance costs.

In compliance with the above aims, according to the present invention there is provided a foodstuff sieve station comprising a sifting assembly which is structured to receive a floury foodstuff preparation to be sifted, and to sift said floury foodstuff preparation for separating the dough balls and/or other impurities from the still-usable floury foodstuff preparation; the foodstuff sieve station being characterized in that the sifting assembly comprises:

a substantially hopper-shaped, outer casing which is arranged with the upper inlet mouth of the casing faced upwards to receive the floury foodstuff preparation to be sifted;

a substantially bell-shaped, rotatable sieve member which is housed/recessed inside said substantially hopper-shaped, outer casing substantially coaxial to a given reference axis tilted to the vertical by an angle greater that 0° and lower that 90°; with the mouth of the bell-shaped sieve member faced upwards, so as to receive the floury foodstuff preparation to be sifted; and a motor assembly which is capable of driving into rotation the bell-shaped sieve member about said reference axis; the bell-shaped sieve member being structured/designed to prevent the dough balls and/or other impurities to freely flow through the body of the same sieve member, and being moreover internally provided with at least one inwardly protruding, substantially helical-shaped assembly that projects from the inner surface of the bell-shaped sieve member and extends along the same inner surface of the bell-shaped sieve member according to a substantially helical-shaped path substantially from the bottom of the sieve member up to the mouth of the same sieve member.

Preferably, though not necessarily, the foodstuff sieve station is characterized by also comprising an upper hopper wherein the user is allowed to pour the floury foodstuff preparation to be sifted; the sifting assembly being arranged beneath the upper hopper with the upper inlet mouth of the substantially hopper-shaped, outer casing at least partially underneath the outlet mouth of the upper hopper so as to receive the floury foodstuff preparation poured into the upper hopper; the rotatable sieve member being housed/recessed inside the substantially hopper-shaped, outer casing with the mouth arranged upwards at least partially underneath the outlet mouth of the upper hopper, so as to receive the to-be-sifted floury foodstuff preparation coming out from said hopper.

Preferably, though not necessarily, the foodstuff sieve station is characterized in that said reference axis is tilted to the vertical by an angle ranging between 50° and 60°.

Preferably, though not necessarily, the foodstuff sieve station is characterized in that the sifting assembly comprises a catch member which is arranged at the upper mouth of said substantially bell-shaped sieve member, and is structured so as to collect the dough balls and/or other impurities coming out from the mouth of the bell-shaped sieve member when the latter rotates.

Preferably, though not necessarily, the foodstuff sieve station is characterized in that the sifting assembly is structured to separately convey the dough balls and/or other impurities and the still-usable floury foodstuff preparation into two distinct storage containers located underneath the same sifting assembly; the first storage container being located underneath the lower outlet mouth of said substantially hopper-shaped, outer casing.

Preferably, though not necessarily, the foodstuff sieve station is characterized in that the catch member is structured so as to channel said dough balls and/or other impurities towards the second storage container.

Preferably, though not necessarily, the foodstuff sieve station is characterized in that the catch member comprises a drain chute having the upper end-portion structured to locally tangentially surround at least part of the rim of the bell-shaped sieve member, so as to collect almost all dough balls and/or other impurities jumping out from the mouth of said sieve member, and is sloped downwards so as to channel by gravity the collected dough balls and/or other impurities away from the bell-shaped sieve member.

Preferably, though not necessarily, the foodstuff sieve station is characterized in that the bell-shaped sieve member is fitted into the substantially hopper-shaped outer casing approximately at the upper inlet mouth of the same outer casing, and in a stable, though manually removable manner.

Preferably, though not necessarily, the foodstuff sieve station is characterized in that the bell-shaped sieve member comprises a substantially cylindrical, bell-shaped rotatable drum which has a perforated or meshlike structure designed so to prevent the dough balls and/or other impurities to freely flow through the body of the same rotatable drum, and which is housed/recessed inside the substantially hopper-shaped, outer casing substantially coaxial to said tilted reference axis, with the mouth of the drum arranged upwards and at least partially immediately underneath the outlet mouth of the upper hopper.

Preferably, though not necessarily, the foodstuff sieve station is characterized in that the rotatable drum is internally provided with at least one protruding rib or winglet that cantilevered juts out from the inner cylindrical surface of the rotatable drum, and extends from substantially the bottom of the drum up to the mouth of the drum according to a substantially helical path.

Preferably, though not necessarily, the foodstuff sieve station is characterized in that the electric motor assembly is capable of driving into rotation the bell-shaped sieve member selectively and alternatively on both rotation directions.

Preferably, though not necessarily, the foodstuff sieve station is characterized by comprising a rigid supporting framework structured for resting on the floor, and an upper worktop arranged substantially horizontal on said supporting framework; the upper hopper being recessed into said worktop.

Preferably, though not necessarily, the foodstuff sieve station is characterized in that the upper worktop is provided with a recessed sink which is located next to the upper hopper.

Preferably, though not necessarily, the foodstuff sieve station is characterized in that the sifting assembly comprises two container housings, one structured to accommodate in easy manually removable manner the first storage container and the other structured to accommodate in easy manually removable manner the second storage container.

Preferably, though not necessarily, the foodstuff sieve station is characterized in that the inlet mouth of the upper hopper is shaped/structured so as to accommodate in manually removable manner a substantially basin-shaped breading lug.

Preferably, though not necessarily, the foodstuff sieve station is characterized in that the first storage container is a substantially basin-shaped, breading lug suitably shaped so as to be manually insertable also into the inlet mouth of the upper hopper.

A non-limiting embodiment of the present invention will now be described, by way of example, with reference to the accompanying drawings, in which:

FIGS. 2 is a schematic section view of the FIG. 1 foodstuff breading station with parts removed for clarity; whereas

Figure 1:
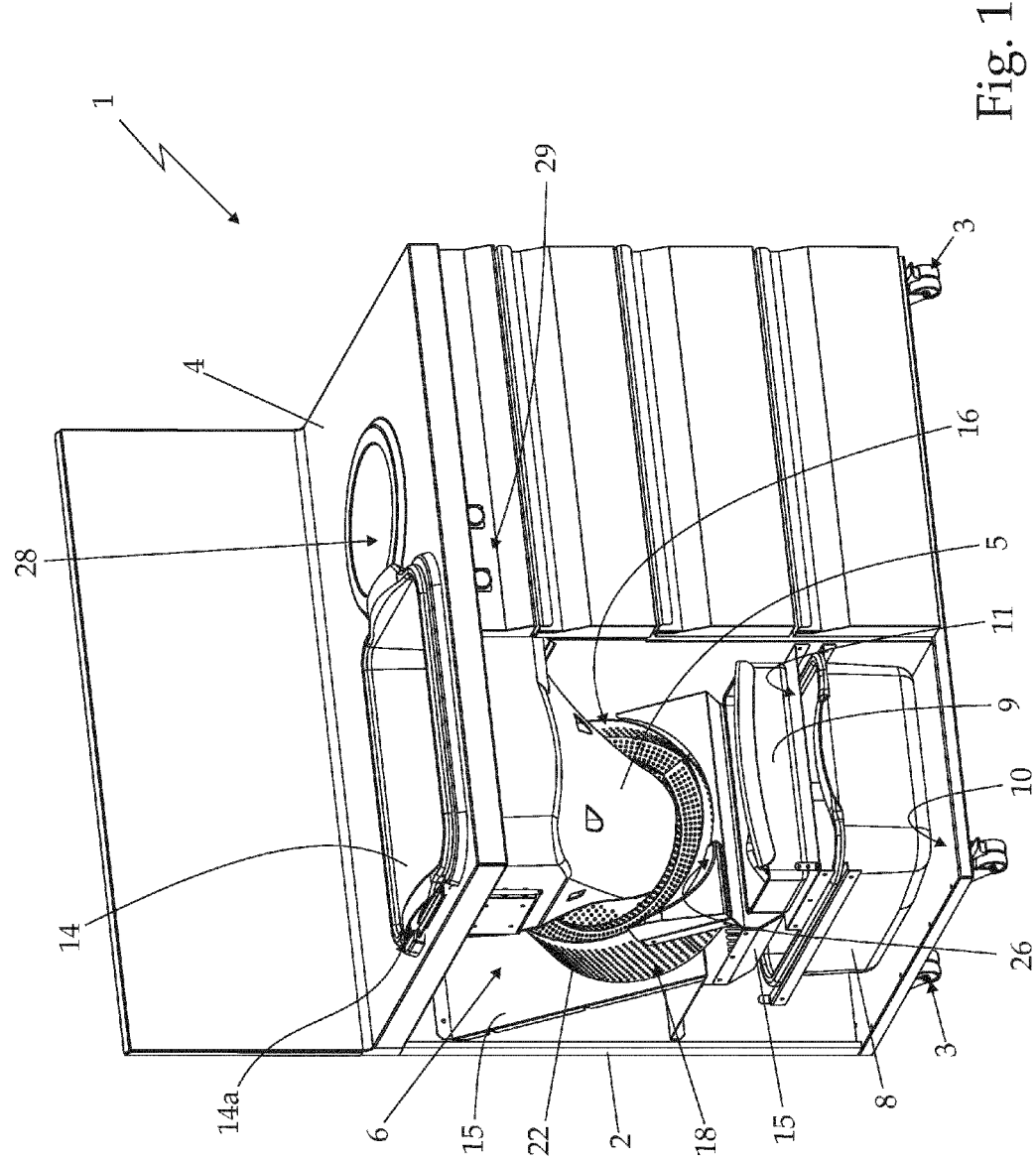
FIGS. 1 is a perspective view of a foodstuff breading station realized in accordance with the teachings of the present invention, with parts removed for clarity.
Figure 2:
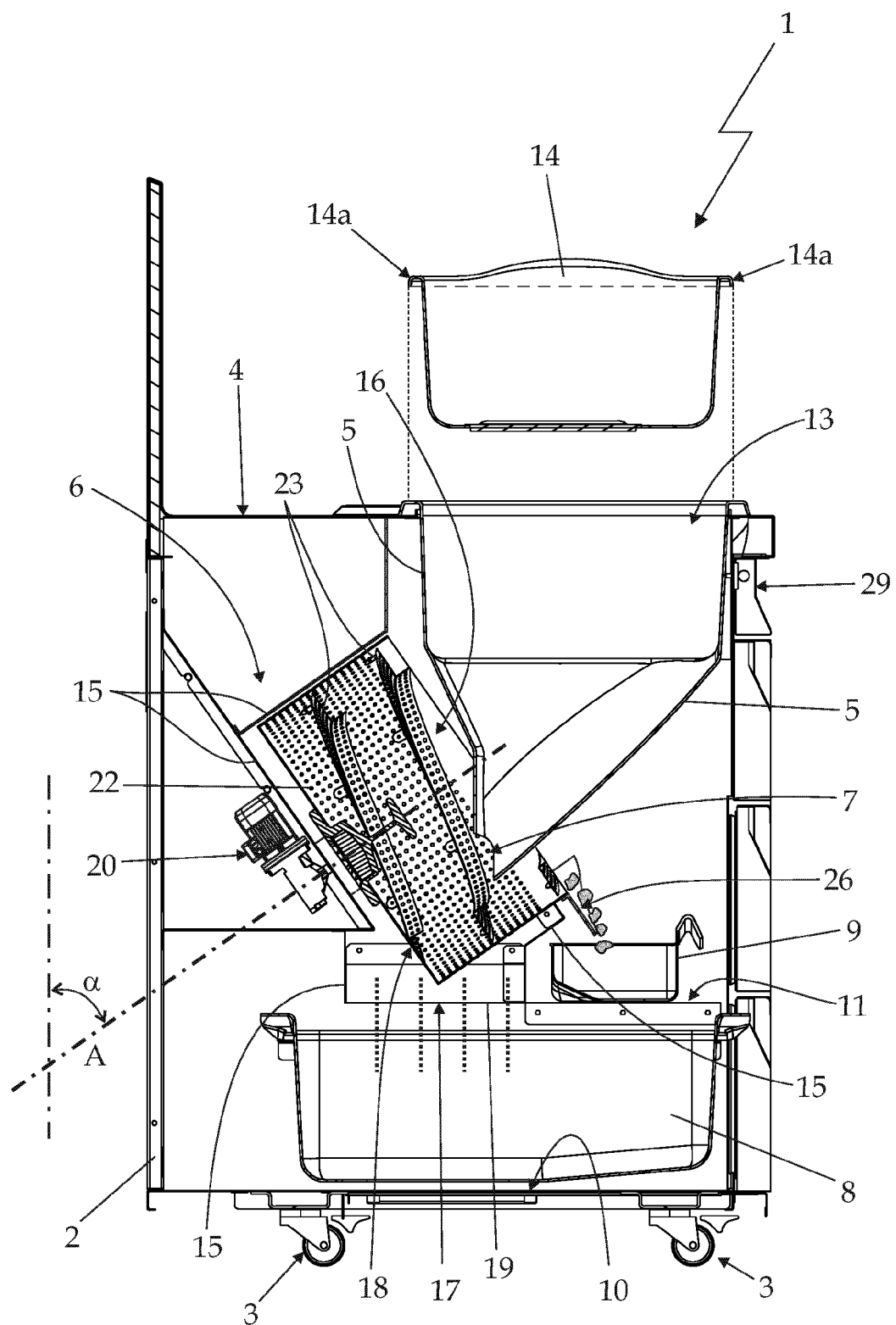

With reference to FIGS. 1 and 2, reference number 1 indicates as a whole a foodstuff sieve station suitable for quickly sifting a floury foodstuff preparation.

More in particular, the foodstuff sieve station 1 is preferably suitable to be used as foodstuff breading station where to manually bread foodstuff pieces such as, for example, chicken pieces, meat pieces, vegetable pieces and the like, and to sift the used breading preparation.

The foodstuff sieve station 1 basically comprises: a rigid supporting framework 2 structured for resting on the floor preferably by means of a number of swiveling wheels 3; a preferably substantially flat, upper worktop 4 which is arranged substantially horizontal on supporting framework 2, and on which the manually breading process of foodstuff pieces preferably takes place; a substantially sink-shaped, upper hopper 5 wherein the user is allowed to pour the used breading preparation to be sifted, and which is recessed into worktop 4; and finally an electrically-operated sifting assembly 6 which is arranged beneath the hopper 5 so as to receive the used breading preparation poured into the hopper 5.

More in detail, the sifting assembly 6 is arranged underneath worktop 4, so as to directly communicate with the lower outlet mouth 7 of hopper 5, and is structured to sift the used breading preparation arriving from hopper 5 for separating the dough balls and/or other impurities from the still-usable breading preparation, and to separately convey the still-usable breading preparation and the dough balls and/or other impurities into two distinct containers 8 and 9 which are located underneath the same sifting assembly 6.

Container 8 is designed for receiving the still-usable breading preparation, whereas container 9 is designed for receiving the dough balls and/or other impurities to be through away.

More in detail, the sifting assembly 6 preferably comprises two container housings 10 and 11, one structured to accommodate the still-usable breading preparation storage container 8 and the other structured to accommodate the dough balls and other impurities storage container 9.

With reference to FIGS. 1 and 2, in the example shown, in particular, the upper worktop 4 is preferably rigidly fixed to the top of supporting framework 2; whereas hopper 5 is preferably inserted in pass-through manner into the upper worktop 4. Furthermore hopper 5 is preferably also recessed into worktop 4 in easy manually removable/extractable manner.

The electrically-operated sifting assembly 6, in turn, is preferably rigidly fixed to the supporting framework 2 underneath the upper worktop 4, substantially vertically aligned underneath the outlet mouth 7 of hopper 5, so that the used breading preparation coming out from the outlet mouth 7 of hopper 5 directly falls by gravity into the sifting assembly 6.

Preferably, though not necessarily, the foodstuff sieve station 1 furthermore comprises a large-meshed, rigid grid structure (not shown) that closes the outlet mouth 7 of hopper 5 for preventing a hand to reach the sifting assembly 6 through the outlet mouth 7.

In addition to the above, with reference to FIGS. 1 and 2, in the example shown the upper inlet mouth 13 of hopper 5 is furthermore preferably shaped/structured so as to accommodate in easy manually removable manner a traditional breading lug 14, i.e. a basin-shaped container 14 designed for receiving a large amount (for example 10-15 kilos) of breading preparation and into which the manual breading process of the foodstuff pieces usually takes place.

More in detail, in the example shown the inlet mouth 13 of hopper 5 is preferably substantially rectangular in shape, and is preferably designed/structured so to as to substantially copy the shape of a breading lug 14, so that a breading lug 14 is easy insertable/recessable in manually removable manner into the hopper 5 up to the peripheral collar or flange 14a of the same breading lug 14.

Figure 3:
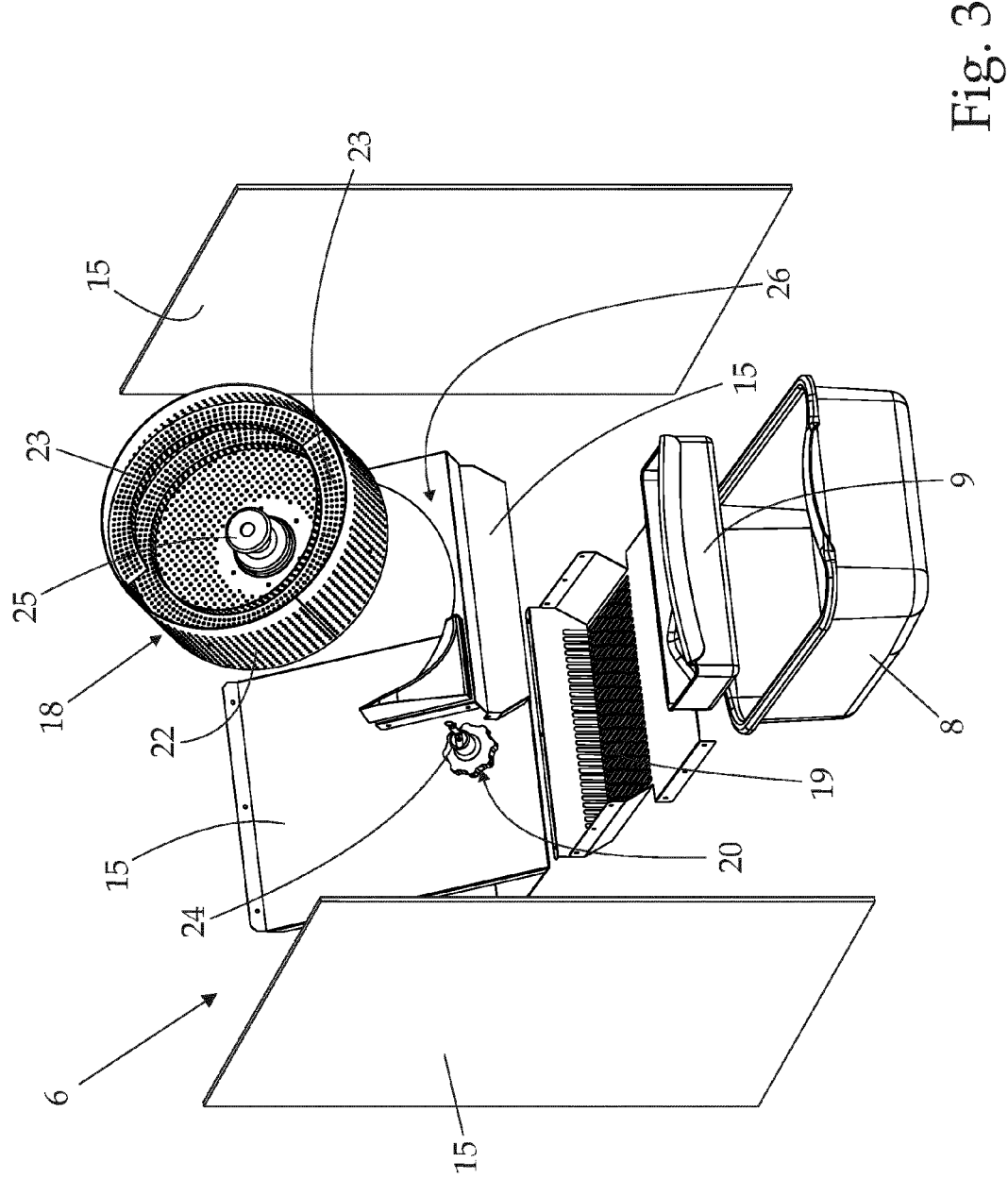
FIG. 3 is a partially exploded perspective view of the sifting assembly of the foodstuff breading station shown in FIGS. 1 and 2.

With reference to FIGS. 1, 2 and 3, the electrically-operated sifting assembly 6 in turn basically comprises:
  a substantially hopper-shaped, boxlike outer casing 15 which is arranged underneath the worktop 4 with the upper inlet mouth 16 of the outer casing 15 faced upwards and located at least partially underneath the outlet mouth 7 of hopper 5, and with the lower outlet mouth 17 of the outer casing 15 faced downwards; and
  a substantially bell-shaped, rotatable sieve member 18 which is at least partially housed/recessed in axially rotatable manner inside the substantially hopper-shaped, outer casing 15 with the mouth of sieve member 18 arranged upwards and at least partially immediately underneath the lower outlet mouth 7 of hopper 5, so as to receive substantially the whole used breading preparation coming out from hopper 5.

More in detail, the substantially hopper-shaped, outer casing 15 is arranged underneath the worktop 4 with lower outlet mouth 17 of the outer casing 15 faced downwards and substantially vertically aligned above the container housing 10 that accommodates container 8. Preferably the substantially hopper-shaped, outer casing 15 is furthermore provided with a large-meshed, rigid grid structure 19 that closes the lower outlet mouth 17 for preventing a hand to reach the sieve member 18 through the outlet mouth 17.

The sieve member 18, in turn, has a preferably substantially cylindrical and bell-shaped body, and is arranged inside the substantially hopper-shaped, outer casing 15 locally substantially coaxial to a reference axis A which is preferably tilted to the vertical by an angle α greater that 0° and lower that 90°. Furthermore the bell-shaped sieve member 18 is specially structured/designed to prevent the used breading preparation having a grain size higher that a given threshold value to freely flow through (i.e. to pass though) the body of the sieve member 18, i.e. to flow out from the sieve member 18.

More in detail, the bell-shaped sieve member 18 is specifically structured/designed to prevent the dough balls and/or other impurities to freely flow through the body of the sieve member 18, and conversely to allow the still-usable breading preparation, i.e. the used breading preparation having a grain size lower that said given threshold value, to freely flow through the body of the sieve member 18.

In other words, assuming that dough balls and/or other impurities generally have a grain size greater than 2 mm (millimeters), the bell-shaped sieve member 18 is suitably structured/designed to prevent the used breading preferably preparation having a grain size higher that 2 mm to freely exit the body of the sieve member 18.

Furthermore, with reference to FIGS. 1, 2 and 3, the body of the bell-shaped sieve member 18 is internally provided with at least one inwardly protruding, substantially helical-shaped assembly that projects from the inner surface of the bell-shaped sieve member 18, and extends along the same inner surface of the bell-shaped sieve member 18 according to a substantially helical-shaped path preferably locally substantially coaxial to reference axis A, substantially from the bottom of sieve member 18 up to the mouth of sieve member 18.

In addition to the above, the sifting assembly 6 furthermore comprises an electric motor assembly 20 which is capable of driving into rotation the bell-shaped sieve member 18 about reference axis A, preferably selectively and alternatively on both rotation directions, i.e. both clockwise and anticlockwise; and a central control unit (not shown) which is capable of controlling the electric motor assembly 20 so as to activate the electric motor assembly 20 and preferably, though not necessarily, also to vary rotation speed and/or rotation direction of the bell-shaped sieve member 18 about rotation axis A according to a given timing stored into the same central control unit.

With reference to FIGS. 1, 2 and 3, in the example shown, in particular, sifting assembly 6 preferably comprises a substantially cylindrical, rotatable drum 22 having a bell-shaped body with a perforated structure, i.e. perforated bottom and/or to side walls, specifically designed to prevent the used breading preparation with a grain size higher that a given threshold value to freely flow through the body of the same rotatable drum 22, and which is housed/recessed inside the substantially hopper-shaped outer casing 15 locally substantially coaxial to reference axis A, with the mouth of the drum arranged upwards and at least partially immediately underneath the lower outlet mouth 7 of hopper 5, so as to receive substantially the whole used breading preparation coming out from hopper 5.

More in detail, the rotatable drum 22 preferably has a perforated structure which is specifically designed so to prevent the dough balls and other impurities to freely flow through the body of rotatable drum 22, and to allow the still-usable breading preparation, i.e. the used breading preparation having a grain size lower that a given threshold value, to freely flow through the body of rotatable drum 22.

In the example shown, in particular, rotatable drum 22 preferably has, on its bottom and/or side walls, holes with a diameter preferably ranging between 0, 5 and 10 mm (millimeters), so as to be able to prevent passage of typical dough balls and to allow passage of typical re-usable breading preparation. More in detail, in the example shown, the holes on bottom and/or side walls of rotatable drum 22 preferably have a diameter of about 2 mm (millimeters).

The electric motor assembly 20, in turn, is structured so to be able to drive into rotation the rotatable drum 22 about reference axis A, preferably selectively on both rotation directions, i.e. both clockwise and anticlockwise.

Furthermore the rotatable drum 22 is internally provided with at least one, and preferably two, protruding ribs or winglets 23 each of which cantilevered juts out from the inner cylindrical surface of rotatable drum 22 preferably in a radial direction, and extends from substantially the bottom of drum 22 up to the mouth of drum 22 according to a substantially helical path locally substantially coaxial to the longitudinal axis of rotatable drum 22, i.e. coaxial to reference axis A.

Preferably each protruding rib or winglet 23 furthermore has a perforated structure, so that the used breading preparation with a grain size lower that a given threshold value is allowed to easily flow through the body of protruding rib or winglet 23.

More in detail, each protruding rib or winglet 23 has a perforated structure which is specifically designed so that solely the still-usable breading preparation is allowed to easily flow through the body of said protruding rib or winglet 23.

Rotatable drum 22 and protruding rib or winglet 23 form the bell-shaped sieve member 18 and the corresponding substantially helical-shaped, inwardly protruding assembly.

In addition to the above, with reference to FIGS. 2 and 3, in the example shown the rotatable drum 22, i.e. the bell-shaped sieve member 18, is preferably at least partially fitted into the substantially hopper-shaped, outer casing 15 substantially at the upper inlet mouth 16 of casing 15, so as to take up almost the whole upper inlet mouth 16. Furthermore the rotatable drum 22, i.e. the bell-shaped sieve member 18, is preferably rotary fitted into the substantially hopper-shaped outer casing 15 in a stable, though easy manually removable manner.

Reference axis A of rotatable drum 22, i.e. of bell-shaped sieve member 18, instead is tilted to the vertical by an angle α preferably, though not necessarily, ranging between 50° and 60°, and in any case preferably ranging between 40° and 80°.

In the example shown, in particular, reference axis A is tilted to the vertical by an angle α of about 55°.

The electric motor assembly 20, in turn, is preferably located outside the substantially hopper-shaped, outer casing 15, and is preferably mechanically coupled to rotatable drum 22 in a stable, though easy detachable manner, via a detachable coupling joint member that preferably protrudes inside the substantially hopper-shaped, outer casing 15.

More in detail, with reference to FIGS. 2 and 3, in the example shown the electric motor assembly 20 preferably comprises a rotating drive shaft 24 that protrudes inside the substantially hopper-shaped outer casing 15 while remaining coaxial to the longitudinal reference axis A, and the bottom wall of rotatable drum 22 is provided with a central hub 25 which is fitted in a stable and preferably, though not necessarily, also easy detachable manner, onto the distal end of drive shaft 24, and is suitably structured to angularly rigidly couple the rotatable drum 22 to the same drive shaft 24.

Preferably, though not necessarily, the drive shaft 24 is furthermore structured so as to directly support the whole rotatable drum 22 inside the substantially hopper-shaped outer casing 15.

With reference to FIGS. 1, 2 and 3, the electrically-operated sifting assembly 6 furthermore comprises a catch member 26 which is arranged at the upper mouth of rotatable drum 22, i.e. of the bell-shaped sieve member 18, and is structured so as to collect the dough balls and other impurities coming out from the mouth of rotatable drum 22 when the latter rotates, and to channel said dough balls and other impurities away from the rotatable drum 22 and towards the second container housing 11 structured to accommodate container 9.

In the example shown, in particular, the dough-balls catch member 26 preferably consists in a drain chute 26 which has the upper end-portion structured to locally tangentially surround at least the lower part of the rim of rotatable drum 22, so as to collect almost all dough balls and/or other impurities jumping out from the mouth of rotatable drum 22, and is sloped downwards so as to channel by gravity the collected dough balls and/or other impurities away from the rotatable drum 22 and towards the outside of the substantially hopper-shaped, outer casing 15.

The lower end-portion of drain chute 26 instead is substantially vertically aligned above container housing 11, so as to tip the collected dough balls and other impurities directly into container 9.

More in detail, the end-portion of drain chute 26 is preferably located outside of the substantially hopper-shaped outer casing 15, substantially beside the lower outlet mouth 17 of the same outer casing 15.

With reference to FIGS. 1 and 2, in addition to the above, the container housings 10 and 11 of sifting assembly 6 are preferably arranged one above the other, and are furthermore preferably structured to accommodate the containers 8 and 9 in manually removable manner.

More in detail, in the example shown the still-usable breading preparation storage container 8 preferably consists in a basin-shaped container substantially identical to breading lug 14, so as to be manually insertable in easy removable manner into the upper inlet mouth 13 of hopper 5 in place of breading lug 14, or vice versa.

The container housing 10 of sifting assembly 6, in turn, is preferably structured so as to accommodate in drawer-like manner any of the two breading lugs 8 and 14, i.e. one of the two basin-shaped containers designed for receiving a large amount (for example 10-15 kilos) of breading preparation and into which the manual breading process of the foodstuff pieces can takes place above worktop 4.

The dough balls and other impurities storage container 9, instead, preferably consists in a substantially rectangular, basin container which is designed for receiving a large amount (for example 1 kilo) of dough balls and/or other impurities to be thrown away.

The container housing 11 of sifting assembly 6, in turn, is preferably structured so as to accommodate said basin container 9 in drawer-like manner.

With reference to FIG. 1, preferably the foodstuff sieve station 1 finally comprises a preferably substantially cylindrical-shaped, upper sink 28 which is recessed into worktop 4 next to hopper 5. The upper sink 28 is preferably suitable to be filled with fresh water arriving from the water mains, and is preferably furthermore designed to accommodate, in easy manually removable manner, a substantially cylindrical, rigid basket (not shown) into which the user can temporarily manually place the foodstuff pieces to be soaked into fresh water before manual breading.

General operation of the foodstuff sieve station 1 is clearly inferable from the above description, thus no further explanation are necessary.

As regards operation of sifting assembly 6, after having manually breaded the foodstuff pieces inside a breading lug 14 preferably fitted into the upper inlet mouth 13 of hopper 5, the user removes the plug from the bottom of breading lug 14 and pours the used breading preparation inside hopper 5.

This used breading preparation then slowly flows by gravity out of hopper 5 through the lower outlet mouth 7 and falls directly into the rotatable drum 22.

Afterwards the user manually acts on a control panel 29 preferably located on a front side of the foodstuff sieve station 1, underneath the front edge of worktop 4, so as to activate the central control unit of sifting assembly 6 for performing the sifting process of the used breading preparation currently stored into the rotatable drum 22.

On activation, the central control unit of sifting assembly 6 controls the electric motor assembly 20 so as to perform a sifting cycle which preferably comprises in sequence the step of driving into rotation the rotatable drum 22, i.e. the bell-shaped sieve member 18, for a given first time period in a first direction of rotation that tends to push/accumulate the used breading preparation (i.e. both the still-usable breading preparation and the dough balls and/or other impurities) towards the bottom of rotatable drum 22; and afterwards the step of driving into rotation the rotatable drum 22, i.e. the bell-shaped sieve member 18, for a given second time period in a second direction of rotation that tends to push the dough balls and/or other impurities towards the upper mouth of rotatable drum 22, i.e. to a direction of rotation opposite to the first direction of rotation.

The first time period preferably, though not necessarily, ranges between 30 seconds and 3 minutes; whereas the second time period preferably, though not necessarily, ranges between 10 and 90 seconds.

During both first and second time periods, the still-usable breading preparation freely flows by gravity through the body of rotatable drum 22, i.e. of bell-shaped sieve member 18, towards container 8.

Dough balls and other impurities instead tends to accumulate on the bottom of revolving drum 22 during first time period, and are pushed upwards by the helical-shaped protruding rib/s or winglet/s 23 so as to jump out of the upper mouth of rotatable drum 22 during second time period. Drain chute 26, i.e. catch member 26, collects and channels this dough balls and other impurities into the container 9 located into container housing 11.

As an alternative, the sifting cycle may comprise solely the step of driving into rotation the rotatable drum 22, i.e. the bell-shaped sieve member 18, for a given time period preferably, though not necessarily, ranging between 30 seconds and 4 minutes, in the direction of rotation that tends to push the dough balls and/or other impurities towards the upper mouth of rotatable drum 22.

The advantages resulting from the particular structure of the electrically-operated sifting assembly 6 are remarkable.

First of all, sifting assembly 6 has no component parts requiring frequent replacement for wear, with the resulting low maintenance costs.

Furthermore sifting assembly 6 is unable to clog because rotatable drum 22, i.e. bell-shaped sieve member 18, can easily accommodate the whole amount of breading preparation usually stored into a breading lug 14.

Finally cleaning of sifting assembly 6 is extremely easy because hopper 5 and rotatable drum 22 are easy removable by the user.

Clearly, changes may be made to foodstuff sieve station 1 without, however, departing from the scope of the present invention.

For example, rather than having perforated bottom and/or side walls, the bell-shaped rotatable drum 22 may have a meshlike structure specifically designed so that solely the used breading preparation with a grain size lower that a given threshold value is allowed to easily flow through the body of rotatable drum 22, whereas the dough balls and other impurities remain entrapped inside the rotatable drum 22.

Similarly, the one or more substantially helical-shaped, protruding ribs or winglets 23 may each have a meshlike structure specifically designed so that solely the used breading preparation with a grain size lower that a given threshold value is allowed to easily flow through the body of the protruding ribs or winglets 23.

According to an alternative non-shown embodiment, the substantially helical-shaped, inwardly protruding assembly of the rotatable sieve member 18 comprises a number of inwardly protruding blades or fins each projecting from the inner surface of the bell-shaped sieve member 18 towards reference axis A preferably substantially in a radial direction, and which are arranged on the inner surface of the bell-shaped sieve member 18 according to a spiral staircase configuration, along a substantially helical-shaped path which is locally substantially coaxial to reference axis A and preferably extends substantially from the bottom of sieve member 18 up to the mouth of sieve member 18.

Lastly, according to a less sophisticated embodiment, the foodstuff sieve station 1 lacks the upper hopper 5, and the user is requested to pour the used breading preparation to be sifted directly into the rotatable sieve member 18 of sifting assembly 6, i.e. directly into rotatable drum 22.

The invention claimed is:

1. A foodstuff sieve station comprising a sifting assembly which is structured to receive a floury foodstuff preparation to be sifted, and to sift said floury foodstuff preparation for separating the dough balls and/or other impurities from the still-usable floury foodstuff preparation;

wherein the sifting assembly comprises:
  a substantially hopper-shaped, outer casing which is arranged with the upper inlet mouth of the casing faced upwards to receive the floury foodstuff preparation to be sifted;
  a substantially bell-shaped, rotatable sieve member which is housed/recessed inside said substantially hopper-shaped, outer casing substantially coaxial to a given reference axis tilted to the vertical by an angle greater that 0° and lower that 90°; with the mouth of the bell-shaped sieve member faced upwards, so as to receive the floury foodstuff preparation to be sifted; and
  a motor assembly which is capable of driving into rotation the bell-shaped sieve member about said reference axis;
the bell-shaped sieve member being structured/designed to prevent the dough balls and/or other impurities to freely flow through the body of the same sieve member, and being moreover internally provided with at least one inwardly protruding, substantially helical-shaped assembly that projects from the inner surface of the bell-shaped sieve member and extends along the same inner surface of the bell-shaped sieve member according to a substantially helical-shaped path substantially from the bottom of the sieve member up to the mouth of the same sieve member.

2. The foodstuff sieve station according to claim 1, further comprising an upper hopper wherein the user is allowed to pour the floury foodstuff preparation to be sifted; the sifting assembly being arranged beneath the upper hopper with the upper inlet mouth of the substantially hopper-shaped, outer casing at least partially underneath the outlet mouth of the upper hopper so as to receive the floury foodstuff preparation poured into the upper hopper; the rotatable sieve member being housed/recessed inside the substantially hopper-shaped, outer casing with the mouth arranged upwards at least partially underneath the outlet mouth of the upper hopper, so as to receive the to-be-sifted floury foodstuff preparation coming out from said hopper.

3. The foodstuff sieve station according to claim 1, wherein said reference axis is tilted to the vertical by an angle ranging between 50° and 60°.

4. The foodstuff sieve station according to claim 1, wherein the sifting assembly comprises a catch member which is arranged at the upper mouth of said substantially bell-shaped sieve member, and is structured so as to collect the dough balls and/or other impurities coming out from the mouth of the bell-shaped sieve member when the latter rotates.

5. The foodstuff sieve station according to claim 4, wherein the sifting assembly is structured to separately convey the dough balls and/or other impurities and the still-usable floury foodstuff preparation into two distinct storage containers located underneath the same sifting assembly; the first storage container being located underneath the lower outlet mouth of said substantially hopper-shaped, outer casing.

6. The foodstuff sieve station according to claim 5, wherein the catch member is structured so as to channel said dough balls and/or other impurities towards the second storage container.

7. The foodstuff sieve station according to claim 6, wherein the catch member comprises a drain chute having the upper end-portion structured to locally tangentially surround at least part of the rim of the bell-shaped sieve member, so as to collect almost all dough balls and/or other impurities jumping out from the mouth of said sieve member, and is sloped downwards so as to channel by gravity the collected dough balls and/or other impurities away from the bell-shaped sieve member.

8. The foodstuff sieve station according to claim 1, wherein the bell-shaped sieve member is fitted into the substantially hopper-shaped outer casing approximately at the upper inlet mouth of the same outer casing, and in a stable, though manually removable manner.

9. The foodstuff sieve station according to claim 1, wherein the bell-shaped sieve member comprises a substantially cylindrical, bell-shaped rotatable drum which has a perforated or meshlike structure designed so to prevent the dough balls and/or other impurities to freely flow through the body of the same rotatable drum, and which is housed/recessed inside the substantially hopper-shaped, outer casing substantially coaxial to said tilted reference axis, with the mouth of the drum arranged upwards and at least partially immediately underneath the outlet mouth of the upper hopper.

10. The foodstuff sieve station according to claim 9, wherein the rotatable drum is internally provided with at least one protruding rib or winglet that cantilevered juts out from the inner cylindrical surface of the rotatable drum, and extends from substantially the bottom of the drum up to the mouth of the drum according to a substantially helical path.

11. The foodstuff sieve station according to claim 1, wherein the electric motor assembly is capable of driving into rotation the bell-shaped sieve member selectively and alternatively on both rotation directions.

12. The foodstuff sieve station according to claim 1, further comprising a rigid supporting framework structured for resting on the floor, and an upper worktop arranged substantially horizontal on said supporting framework; the upper hopper being recessed into said worktop.

13. The foodstuff sieve station according to claim 12, wherein the upper worktop is provided with a recessed sink which is located next to the upper hopper.

14. The foodstuff sieve station according to claim 5, wherein the sifting assembly comprises two container housings, one structured to accommodate in easy manually removable manner the first storage container and the other structured to accommodate in easy manually removable manner the second storage container.

15. The foodstuff sieve station according to claim 1, wherein the inlet mouth of the upper hopper is shaped/structured so as to accommodate in manually removable manner a substantially basin-shaped breading lug.

* * * * *